Patented July 25, 1950

2,516,306

UNITED STATES PATENT OFFICE 2,516,306

POLYFUNCTIONAL ESTERS

Don E. Floyd, Minneapolis, Minn., assignor to General Mills, Inc., a corporation of Delaware No Drawing. Application March 22, 1947, Serial No. 736,580

7 Claims. (Cl. 260—476)

The present invention relates to new polyfunctional esters and to the process of preparing said esters.

The esters of the present invention may be represented by the following general formula:

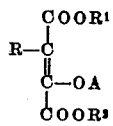

in which R represents an aliphatic radical containing from 4 to 16 or more carbon atoms and may be saturated or unsaturated. Moreover R may include groups in which one or more hydrogen atoms has been replaced by one or more atoms or groups such as chlorine, nitro, and the like. Likewise R may be a straight or branched carbon chain or may be composed of the entire radicals beyond the alpha-carbon atom of the fatty acids of fat or oil. $R^1$ and $R^2$ may be alike or different residues of monohydric alcohols. Typical of such residues are the aliphatic groups containing from 1 to 10 carbon atoms, and also groups in which the carbon chain is interrupted by one or more hetero atoms such as oxygen, sulfur or nitrogen. Typical of these hetero residues are the radicals derived from glycol ethers such as ethylene glycol monoethyl ether, and diethylene glycol monoethyl ether. One or more hydrogen atoms in the groups $R^1$ and $R^2$ may be replaced by other atoms or groups such as chlorine, nitro, hydroxyl, and the like. A represents an acidic residue of any mono-carboxylic acid. This acidic residue may vary widely and may include residues of such acids as aliphatic, aromatic, alicyclic, or arylaliphatic acid. Typical of such residues are the groups acetyl, benzoyl, palmityl, phenylacetyl, and hexahydrobenzoyl.

Compounds of the present invention are useful in numerous ways. They are highly functional and accordingly lend themselves very useful as intermediates in further syntheses. Aside from this use, the esters themselves have been found to be excellent plasticizers for synthetic resins.

Plasticizers, in order to be useful for most synthetic resins and plastics, must impart clearness, toughness, flexibility, pliability, and extensibility to resinous materials and plastics. Moreover, they must be permanent in nature and not subject to change. They must have a low volatility such that they are not vaporized from the plastic material during use. The esters of the present invention have these desired properties. They are highly compatible with resins and plastics in general, and particularly with polyvinyl resins and cellulose esters, the former type of resin being particularly difficult to plasticize. Moreover, they have very low volatility and accordingly loss of plasticizer by evaporation is not encountered when these plasticizers are employed. In general, these esters are liquids and remain liquid even at low temperature, such that they can impart flexibility and toughness to resins even at low temperature.

While these esters may be prepared by various methods, it is preferred that they be prepared by the condensation of a carboxylic acid ester with an oxalate ester in the presence of an alkaline catalyst, followed by acylation. Details of this process will be apparent from the following examples which describe esters prepared in this manner.

Example 1

23 g. (1 mole) metallic sodium was dissolved in 300 cc. of absolute ethanol. To this solution was added 584 g. (4 moles) of ethyl oxalate and 228 g. (1 mole) of ethyl laurate. The mixture was heated at about 50° C. while ethanol was continuously distilled off (B. P. 34–7° C./85–100 mm.). When no more ethanol was obtained as distillate, the pressure was reduced to 19 mm. and the excess ethyl oxalate was distilled off (B. P. 91–4° C./19 mm.). The weight of ethyl oxalate recovered was 396 g.

The brown viscous liquid which remained was cooled to about 50° C. and then 112 g. (1 mole plus 10° excess) of acetic anhydride was added to it with stirring. The resulting solution was heated at 100° C. for two hours in a flask connected to a condenser protected by a Drierite tube.

The semi-solid mass was cooled to room temperature and washed with water to remove the sodium acetate and to decompose the excess of anhydride. The residue was dissolved in ether and the solution washed with water and dried. The ether was removed by distillation and the reaction product was distilled under reduced pressure. There was obtained 298 g. of nearly colorless distillate, boiling at 160–3° C./1 mm.

Example 2

23 g. (1 mole) of metallic sodium was dissolved in absolute ethanol as before, but most of the excess ethanol was evaporated off under reduced pressure. To the residue was added 584 g. (4 moles) of ethyl oxalate and 200 g. (1 mole) of ethyl caprate. The resulting solution was heated at a temperature of 45–55° C. while ethanol was continuously distilled off at a pressure of about 100 mm. When no more ethanol was obtained as distillate, the pressure was reduced to about 14 mm. and the excess ethyl oxalate was distilled off. There was recovered 409 g. of ethyl oxalate (B. P. 82–6° C./14 mm.).

The residue was cooled to room temperature and dissolved in 600 cc. of dry ether. 154 g. (1 mole plus 10% excess) of benzoyl chloride was added to this solution at such a rate that gentle refluxing resulted. The mixture was stirred mechanically during the addition. The mixture soon became viscous, almost jelly-like in consistency. It was heated at gentle reflux and stirred for two more hours after all of the benzoyl chloride had been added.

The mixture was cooled and washed thoroughly. The ether solution was dried over sodium sulfate and the ether was later removed by distillation. The reaction product was distilled and was found to boil at 192–6° C./0.15 mm. The yield was 344 g.

*Example 3*

23 g. (1 mole) of metallic sodium was used to prepare sodium ethoxide in the usual manner. Most of the excess ethanol was evaporated off under reduced pressure. To the residue was added 438 g. (3 moles) of ethyl oxalate and 144 g. (1 mole) of ethyl caproate.

The reaction was conducted as in the previous examples by continuously distilling off ethanol at a pressure in the range of 95–100 mm. while heating the reaction mixture gently. When no more alcohol was obtained as distillate, the pressure was reduced to 18 mm. and the excess ethyl oxalate was distilled off. (B. P. 86–9. C./18 mm.). 266 g. of ethyl oxalate was recovered.

The residue was cooled and dissolved in two volumes of dry benzene. The solution was mechanically stirred while 166 g. (1 mole plus 5% excess) of butyric anhydride was added through a dropping funnel at such a rate that the heat of reaction maintained the temperature at 40–50° C. When all of the butyric anhydride had been added, the mixture became quite viscous, almost jelly-like in consistency. It was heated at 40–50° C. and stirred for two more hours.

The mixture was cooled and washed thoroughly. The benzene solution was dried over sodium sulfate and the benzene was later distilled off. The reaction product was distilled under reduced pressure and was found to have a boiling point of 140–1° C./0.1 mm. The yield was 281 g.

*Example 4*

23 g. (1 mole) of sodium was dissolved in 300 cc. of absolute ethanol. To this solution was added 365 g. (2.5 moles) of ethyl oxalate and 312 g. (1 mole) of ethyl stearate.

The reaction was conducted in the same manner as in the previous examples until no more ethanol was obtained as distillate. Then the pressure was reduced and 194 g. of ethyl oxalate (B. P. 83–7° C./15 mm.) was recovered by distillation.

The residue was cooled and dissolved in 600 cc. of dry ether. The solution was mechanically stirred while 119 g. (1 mole plus 10% excess) of ethyl chloroformate was added from a dropping funnel at such a rate that gentle refluxing of the ether resulted. The refluxing was continued for two hours by external heating after the addition of the ethyl chloroformate had been completed.

The jelly-like mass was washed thoroughly and the ether solution was dried over sodium sulfate. The ether was removed by distillation, leaving 441 g. of a pale amber oil with a faint, pleasant odor. This oil had a very high boiling-point and could not be distilled without decomposition at a pressure of 0.2 mm.

While the above examples have been with particular reference to the use of ethyl esters in the condensation, other esters, such as those previously described, may be employed during this step. It is also possible to carry on the condensation between ethyl esters and subsequently change the alcoholic esterifying group by alcoholysis. This is particularly true where it is desired to produce esters having more complicated alcohol residues than the simple alcohol residues in the ethyl esters. Where R is derived from fatty acid esters, it usually will not exceed 16 carbon atoms in length. R may, however, have a greater length than 16 when the group is derived from fatty acid groups having more than 18 carbon atoms, as for example when $C_{20}$ and $C_{22}$ acids from fish oils are used.

In addition to the specific examples set forth, numerous other compounds such as

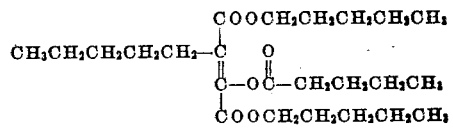

and

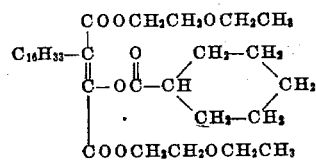

may also be prepared in this way, and in general these compounds will have the properties of those set forth above. It will be apparent, however, that the particular properties and the particular usefulness of these compounds as plasticizers and as organic intermediate will depend to some extent upon the various substituent groups in the compounds.

While various modifications of the invention have been described, it is to be understood that this invention is not limited thereto, but may be varied within the scope of the following claims.

I claim as my invention:

1. Esters having the following formula:

in which R represents an alkyl radical containing from 4 to 16 carbon atoms, $R^1$ and $R^2$ are alkyl groups containing from 1 to 10 carbon atoms, and A is an acyl group of a carboxylic acid having a hydrocarbon residue.

2. Esters having the following formula:

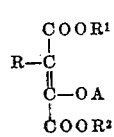

in which R represents an alkyl radical containing from 4 to 16 carbon atoms, $R^1$ and $R^2$ are alkyl groups containing from 1 to 10 carbon atoms, and A is the acyl group of a low fatty acid.

3. Esters having the following formula:

$$\begin{array}{c} COOR^1 \\ R-C \\ \parallel \\ C-OA \\ COOR^2 \end{array}$$

in which R represents an alkyl radical containing from 4 to 16 carbon atoms, $R^1$ and $R^2$ are alkyl groups containing from 1 to 10 carbon atoms, and A is benzoyl.

4. Esters having the following formula:

$$\begin{array}{c} COOR^1 \\ R-C \\ \parallel \\ C-OA \\ COOR^2 \end{array}$$

in which R represents an alkyl radical containing from 4 to 16 carbon atoms, $R^1$ and $R^2$ are low alkyl groups, and A is an acyl group of a carboxylic acid having a hydrocarbon residue.

5. Esters having the following formula:

$$\begin{array}{c} COOR^1 \\ R-C \\ \parallel \\ C-OA \\ COOR^2 \end{array}$$

in which R represents an alkyl radical containing from 4 to 16 carbon atoms, $R^1$ and $R^2$ are low alkyl groups, and A is the acyl group of a low fatty acid.

6. Esters having the following general formula:

$$\begin{array}{c} COOEth \\ R-C \\ \parallel \\ C-OA \\ COOEth \end{array}$$

in which R represents an alkyl group containing from 4 to 16 carbon atoms, and A is the acyl group of a low fatty acid.

7. Esters having the following general formula:

$$\begin{array}{c} COOR^1 \\ R-C \\ \parallel \\ C-OA \\ COOR^2 \end{array}$$

in which R represents an alkyl group containing from 4 to 16 carbon atoms, $R^1$ is methyl, $R^2$ is ethyl, and A is acetyl.

DON E. FLOYD.

REFERENCES CITED

The following references are of record in the file of this patent:

FOREIGN PATENTS

| Number | Country | Date |
|--------|---------|------|
| 418,325 | Great Britain | Oct. 23, 1934 |